Patented Jan. 6, 1931

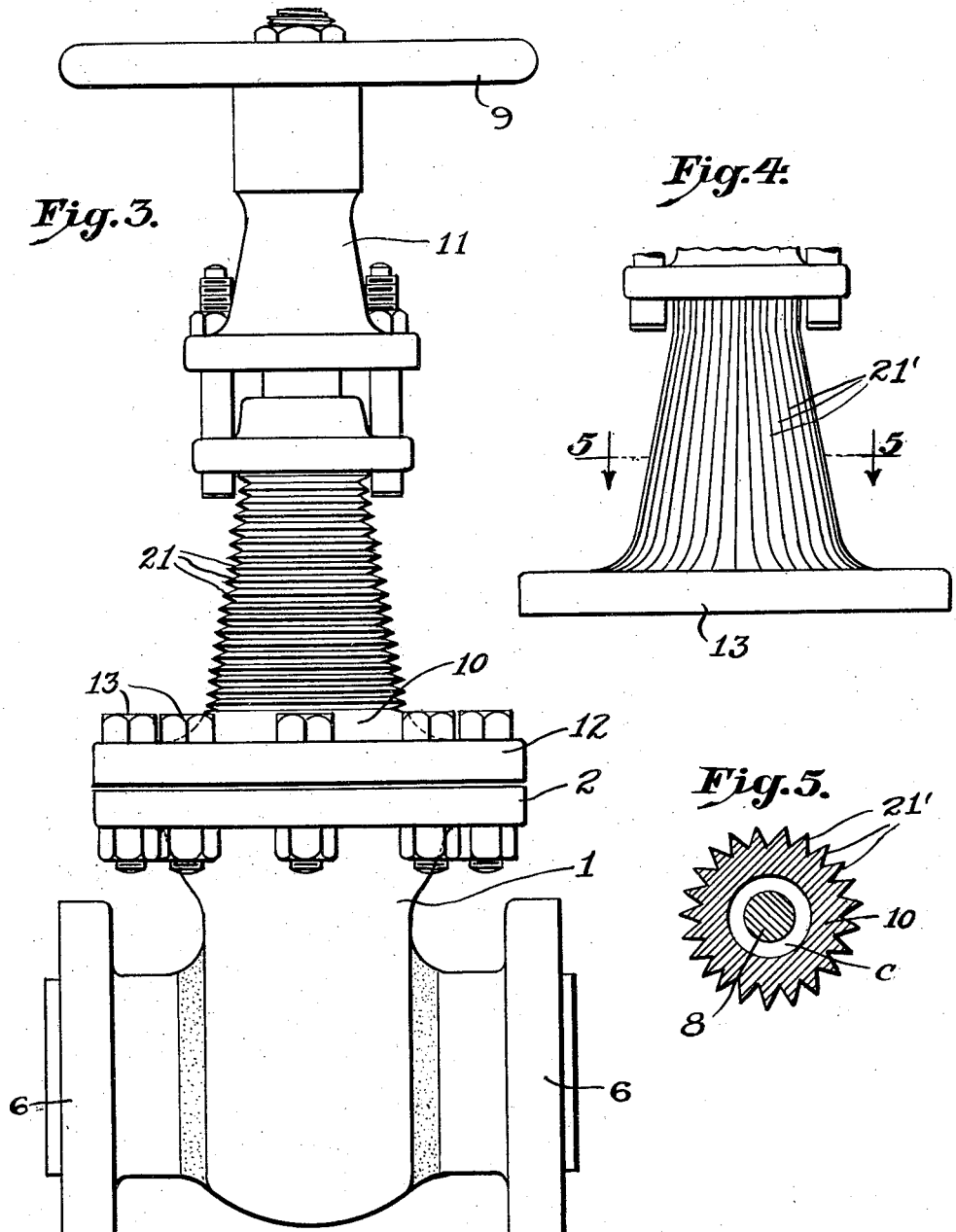

1,788,000

UNITED STATES PATENT OFFICE

STANLEY W. SPARKS, OF SUMMIT, NEW JERSEY, ASSIGNOR TO THE COLUMBUS MACHINE COMPANY, OF COLUMBUS, OHIO, A CORPORATION OF OHIO

VALVE SUPERSTRUCTURE

Application filed November 20, 1925. Serial No. 70,209.

This invention relates to improvements in high-pressure and high temperature valves and has particular reference to super-structures therefor.

The principal objects of the invention are the provision of a highly durable valve super-structure which has little tendency to warp or become distorted by heat or high pressures and which does not require frequent repacking of the valve, thus avoiding the necessity for shutting down apparatus on which the same is employed in order to permit of such repacking.

My invention is fully set forth in the following detail description and drawings forming a part thereof in which Figure 1 is a vertical section, partially in elevation showing my improved super-structure applied to a gate valve;

Fig. 3 is a front elevation of a similar valve, but provided with a modified form of super-structure;

Fig. 4 is a fragmentary elevation of a still further modification; and

Fig. 5 is a transverse section on the line 5—5 of Fig. 4.

Figure 1:
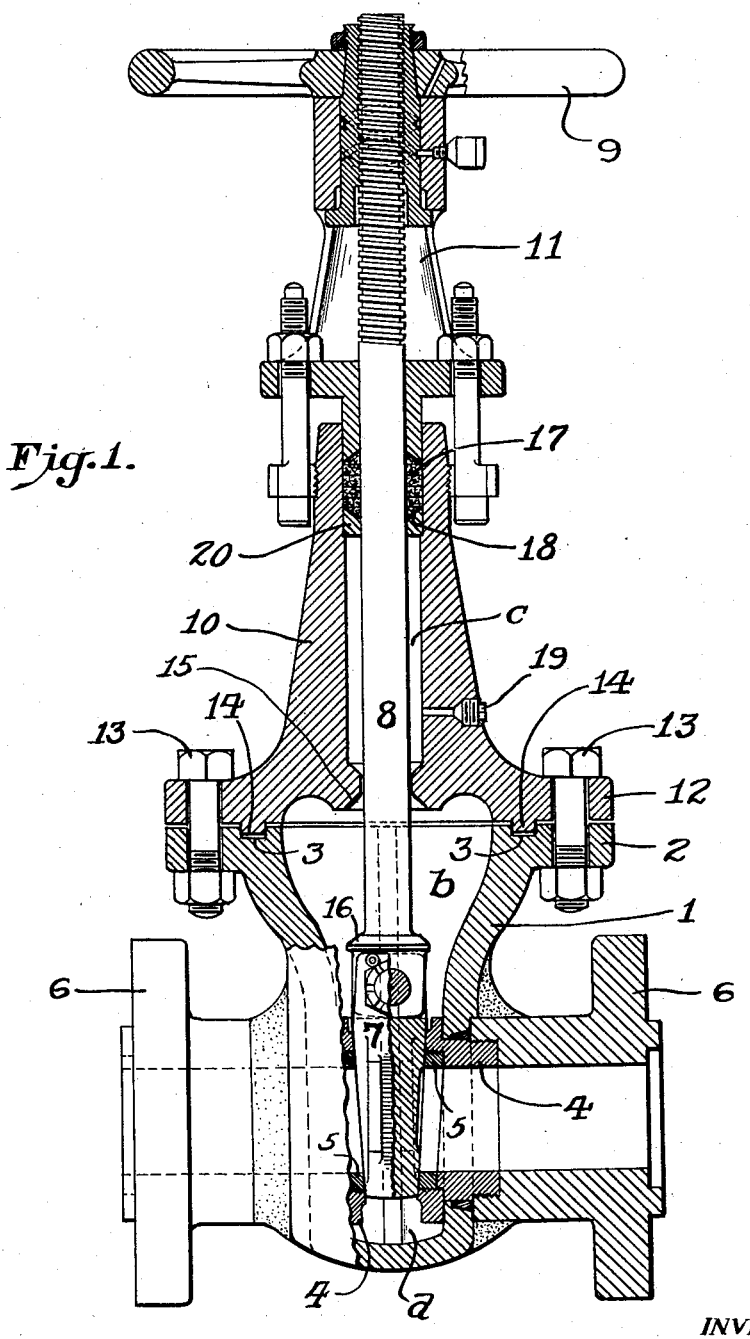
Figure 2:
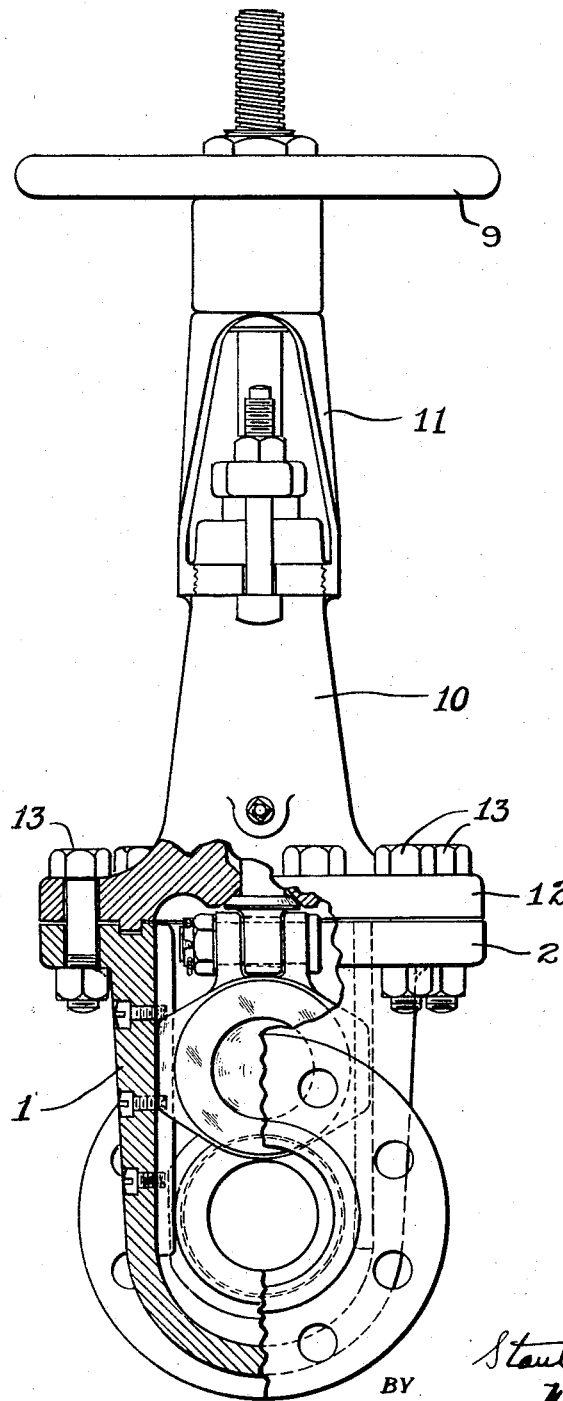
Fig. 2 is an end elevation partially in section of such valve.

Referring to the drawings and the construction shown therein, the reference numeral 1 designates the casing of the valve body proper, the same being of the general external configuration of a cylinder having flattened sides and having an oblong valve chamber $a$ in the bottom portion thereof which is of considerably reduced cross-sectional area as compared with an upper heat-radiating chamber $b$ that is of an upwardly flaring configuration and generally circular in cross-section. A peripheral flange 2 having a groove 3 serves to connect the valve body to the super-structure described.

The flattened side walls of said casing 1 are provided with opposing apertures adapted to receive internal bushing members 4 which carry valve seats 5 on their respective inner ends and are secured at their outer ends to hollow hub members 6.

A tapered gate member 7 which is operatively secured to a valve-stem 8 that is operable by a hand wheel 9 is adapted to co-operate with the valve-seats 5 and seal communication through the respective hollow hub members 6.

A super-structure comprising a tapering bonnet member 10 to which is secured the yoke 11, is bolted by means of a peripheral flange 12 and bolts 13 to the corresponding flange 2 on the valve body, said flange 12 being provided with an annular rib or tongue member 14 which registers with and snugly fits in the groove 3 so as to more effectively seal the joint between said flanges.

The said bonnet is provided with a bevelled ground recess 15 which serves as a seat for the bevelled collar 16 carried by said valve stem and admits of replacing the packing 17 in a stuffing box 18 when necessary without shutting down the portion of the line controlled by the gate.

The said bonnet is provided with an elongated cylindrical chamber $c$ which has an aperture 19 at the bottom and is adapted to snugly engage the valve-stem 8 and is closed at its upper end by an apertured plug or partition 20 that forms the lower end of the stuffing box 18.

As shown, the external configuration of the bonnet substantially conforms to a truncated cone and the same may either have a smooth or plain exterior surface, as shown in Fig. 1, or as I much prefer, the same may be of fluted configuration having a series of horizontally disposed fins or ribs 21, as shown in Fig. 3 or again such fins 21' or ribs may be longitudinally disposed, as shown in Figs. 4 and 5. Whichever form of bonnet is employed, whether of plain or fluted external shape, the overall dimensions of the same should be such that the vertical distance from the top of the flange 12 to the bottom of the plug or partition 20 should be not less than the maximum diameter of the bonnet, exclusive of its flange portion 12, and, in the case of a bonnet of tapered shape, at least 1½ the minimum external diameter of the bonnet; for example, the preferred dimensions of a bonnet of a valve, having a radiation chamber of an internal diameter of 5" are 5" external diameter at the base immediately above the flange 3⅓" external diameter at the base of the stuffing box and a vertical height therebetween of 5".

The provision of a bonnet of the character herein described not only prolongs the life of the packing of the stuffing box, but serves as an effective continuation of the radiating chamber and thereby more effectively radiates or dissipates into the atmosphere the heat from the valve body proper, thus cooling the latter very materially and thus preventing continuous deterioration of the metal in the body with the consequent substantial increase of the life of the valve.

By thus radiating the heat from the body of the valve the fatigue of the metal of the body and tendency of same to crystallize is materially lessened thereby prolonging the life of the body. This is considered important also, as obviously if the crystallization or fatigue is lessened, the metal of the body is capable of withstanding greater internal pressures and consequently the tendency to distort is also lessened.

This is a continuation in part of applicant's co-opending application No. 729,752 for valves filed August 2nd, 1924.

Having thus described my invention what I desire and claim to obtain by Letters Patent of the United States is:

1. In a valve, the combination comprising a valve body member provided with opposing lateral apertures and having a lower valve chamber and an upwardly flaring radiation chamber above and in communication with the valve chamber, a flanged superstructure secured to said body member and serving to seal the top of said radiation chamber, said superstructure including an elongated bonnet member having externally projecting cooling fins and said bonnet member being provided with a stuffing box the height of the stuffing box above the body member being greater than the maximum external diameter of said bonnet member at a point immediately above the flange thereof.

2. In a valve, the combination comprising a valve body member provided with opposing lateral apertures and having a lower valve chamber and an upwardly flaring radiation chamber above and in communication with the valve chamber, a flanged superstructure secured to said body member and serving to seal the top of said radiation chamber, said superstructure including an elongated bonnet member having externally projecting cooling fins arranged in a superimposed longitudinal series and said bonnet member being provided with a stuffing box the height of the stuffing box above the body member being greater than the maximum external diameter of said bonnet member at a point immediately above the flange thereof.

Signed at New York, in the county and State of New York, this 6th day of Nov., 1925.

STANLEY W. SPARKS.